No. 772,118. PATENTED OCT. 11, 1904.
J. E. AHLVIN.
JOINERY.
APPLICATION FILED NOV. 2, 1903.
NO MODEL.
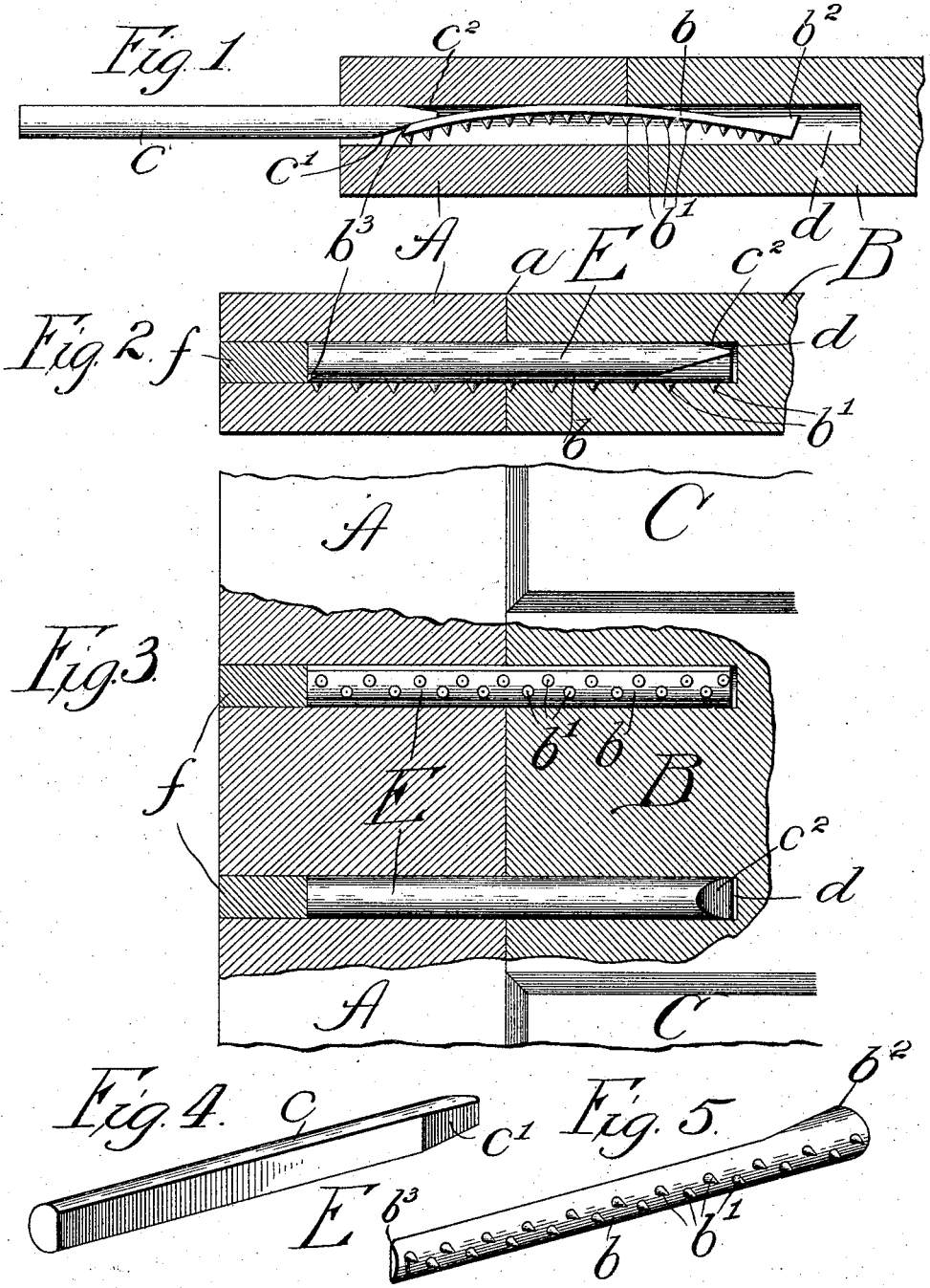

No. 772,118. Patented October 11, 1904.

UNITED STATES PATENT OFFICE.

JOHN E. AHLVIN, OF JOLIET, ILLINOIS.

JOINERY.

SPECIFICATION forming part of Letters Patent No. 772,118, dated October 11, 1904.

Application filed November 2, 1903. Serial No. 179,437. (No model.)

*To all whom it may concern:*

Be it known that I, JOHN E. AHLVIN, a citizen of the United States, residing at Joliet, in the county of Will and State of Illinois, have invented a new and useful Improvement in Joinery, of which the following is a specification.

My invention relates particularly to joints between wooden parts—as, for instance, the joints between the stiles and rails of a panel door.

My primary object is to provide improved means of forming a joint, whereby expense may be saved in the framing operation, lumber may be saved, and a more serviceable joint produced.

The invention is illustrated in the accompanying drawings, in which—

Figure 1 represents a broken sectional view showing a joint between a stile and rail of a door in process of formation; Fig. 2, a similar section showing the joint completed; Fig. 3, a broken elevational view, partly in section, of the door; Fig. 4, a perspective view of a wedge employed; and Fig. 5, a perspective view of a joining-strip employed, assuming the same to be held in the straightened condition.

In the construction shown, A represents a stile of a panel door; B, the center or an intermediate rail; C, panels of the door, and E my improved connecting device, employed in this instance in joining the rail to the stile. Two of the devices E, with relatively reversed joining-strips and wedges, are shown in Fig. 3.

Heretofore it has been the common practice in constructing doors to mortise the stiles and provide the rails with tenons fitting into the mortises. In the improved construction the end of the rail abuts squarely against the inner edge of the stile, as indicated at the joint-line $a$, and perforations extending through the stile and into the rail are provided for the connecting devices. Each of said devices comprises a joining member or tension member $b$, equipped on one side with normally projecting points or brads $b'$ substantially rigid therewith, and a wedge $c$, engaging the plane side of the member $b$ opposite the point-equipped side thereof. Preferably the member $b$ has a cross-section like a small segment of a circle and the wedge a cross-section like a large segment of a circle, the two sections being complementary. The member $b$ has at its inner end a wedge-shaped enlargement $b^2$, and the member $c$ has a beveled surface $c'$ at its inner end adapted to engage said wedge-shaped portion of the member $b$. The member $c$ is beveled at $c^2$ also. The member $b$ is slightly beveled at its outer end, as indicated at $b^3$. By preference the member $b$ is bowed longitudinally, so that the end portions of its point-equipped side bear against one wall of the bore $d$, while the central portion of the opposite plane side bears against the opposite wall of said bore. Thus the springiness of the member $b$, which member may be of malleable iron or any other suitable material, is depended upon to hold the member in the desired position within the bore till the wedge can be entered. As the wedge is driven in the points $b'$ are forced into the wood, and since the connecting member crosses the joint-line $a$ it is evident that the stile and rail will be firmly bound together. The members $b$ and $c$ together possess sufficient strength to give rigidity to the joint and prevent possibility of shearing under pressure.

It will be understood, of course, that any desired number of the connecting devices may be employed at each joint.

The connecting device is made shorter than the bore which receives it, and the end of the bore is filled by a plug $f$ of the same material as the door, so that the appearance of the door is in no wise impaired.

It readily will be understood that my improved construction results in the saving of several feet of material in a door, besides avoiding danger of waste in manufacture and enhancing the durability of the joints.

Changes in details of construction are contemplated. Hence no undue limitation should be understood from the foregoing detailed description.

What I regard as new, and desire to secure by Letters Patent, is—

1. A joint comprising two abutting members provided with alined bores, and two complemental members fitting in said bores and crossing the meeting plane of said first-named members, one of said complemental members having lateral points substantially rigid therewith and entering the walls of said bores.

2. A joint comprising two abutting members provided with alined bores, and two complemental members therein crossing the meeting plane of said abutting members, one of said complemental members having lateral points substantially rigid therewith and entering the walls of the bores and having an inclined surface, whereby a wedge action is secured to force the points into said walls, for the purpose set forth.

3. A joint comprising abutting members with alined bores, a connecting-strip of relatively small cross-section provided on one side with lateral points substantially rigid therewith, and a complemental wedge member, said strip and said wedge crossing the meeting plane of said abutting members, for the purpose set forth.

4. A joint comprising abutting members with alined bores, a connecting-strip of relatively small cross-section provided on one side with lateral points rigid therewith and provided on the other side with a beveled enlargement at the inner end of said strip, and a complemental member having a beveled inner end, said strip and complemental member crossing the meeting plane of said abutting members, for the purpose set forth.

5. A connecting member for joints, comprising a resilient curved strip having points on its concave surface and having a smooth opposite surface.

6. A connecting member for joints, comprising a long narrow unfolded strip having a part-cylindrical surface provided with points and an opposite smooth surface terminating at the inner end of the strip in a beveled projection, for the purpose set forth.

7. A joint comprising two abutting members having alined bores, and a fastening device comprising a member having a point-equipped part-cylindrical surface and a plane surface opposite the cylindrical surface terminating in a beveled surface, and a complemental wedge having a plane surface, engaging said first-named plane surface and a beveled surface at its inner end engaging said first-named beveled surface, both members of said fastening device crossing the meeting plane of said abutting members, for the purpose set forth.

JOHN E. AHLVIN.

In presence of—
 WALTER N. WINBERG,
 W. B. DAVIES.